(12) United States Patent
Findley

(10) Patent No.: US 10,577,249 B2
(45) Date of Patent: Mar. 3, 2020

(54) TAILORABLE POLYORBITAL-HYBRID CERAMICS

(71) Applicant: Lockheed Martin Corporation, Bethesda, MD (US)

(72) Inventor: David Glen Findley, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 127 days.

(21) Appl. No.: 15/594,198

(22) Filed: May 12, 2017

(65) Prior Publication Data

US 2018/0327270 A1     Nov. 15, 2018

(51) Int. Cl.
| | | |
|---|---|---|
| *C01B 33/021* | (2006.01) | |
| *H02K 1/02* | (2006.01) | |
| *C01B 32/05* | (2017.01) | |
| *H02K 15/02* | (2006.01) | |
| *C01B 32/956* | (2017.01) | |

(52) U.S. Cl.
CPC .......... *C01B 33/021* (2013.01); *C01B 32/05* (2017.08); *C01B 32/956* (2017.08); *H02K 1/02* (2013.01); *H02K 15/024* (2013.01)

(58) Field of Classification Search
None
See application file for complete search history.

(56) References Cited

U.S. PATENT DOCUMENTS

| | | |
|---|---|---|
| 5,516,884 A | 5/1996 | Bianconi |
| 6,342,195 B1 | 1/2002 | Roy et al. |
| 6,720,620 B1 | 4/2004 | Partee et al. |
| 8,013,109 B2 | 9/2011 | Toppare et al. |
| 9,035,017 B2 | 5/2015 | Berrang |
| 2010/0063248 A1* | 3/2010 | Toppare ............... C08G 61/02 528/396 |

(Continued)

OTHER PUBLICATIONS

Ovchinnikov, A.A. et al., "The structure of the ferromagnetic phase of carbon," Journal of Molecular Structure: Theochem, vol. 251, Dec. 6, 1991, pp. 133-140.

(Continued)

*Primary Examiner* — Guinever S Gregorio
(74) *Attorney, Agent, or Firm* — Baker Botts L.L.P.

(57) ABSTRACT

In an embodiment, a method includes producing a mixed feedstock of at least three halogenated monomer feedstocks. A first of the at least three halogenated monomer feedstocks includes an SP3 carbon, a second of the at least three halogenated monomer feedstocks includes an SP2 carbon, and a third of the at least three halogenated monomer feedstocks includes at least two SP1 carbons. The method further includes producing a polyorbital-hybrid pre-ceramic polymer comprising the SP1 carbons, the SP2 carbon, and the SP3 carbon. The polyorbital-hybrid pre-ceramic polymer is produced by reducing the mixed feedstock such that one or more halogen atoms are removed from the mixed feedstock. The method also includes fabricating the polyorbital-hybrid pre-ceramic polymer into a greenware form and producing a polyorbital-hybrid ceramic carbon comprising the SP1 carbons, the SP2 carbon, and the SP3 carbon. The polyorbital-hybrid ceramic carbon is produced by thermolyzing the polyorbital pre-ceramic polymer.

10 Claims, 4 Drawing Sheets

(56) References Cited

U.S. PATENT DOCUMENTS

2015/0166349 A1 6/2015 Booth et al.
2017/0036912 A1 2/2017 Narayan

OTHER PUBLICATIONS

Bianconi, P. A. et al., "Diamond and Diamond-Like Carbon from a Preceramic Polymer," Journal of the American Chemical Society, Feb. 24, 2014, pp. 3191-3202.
Nur, Y. et al., "Electrochemical polymerization of hexachloroethane to form poly (hydridocarbyne): a pre-ceramic polymer for diamond production," Journal of Materials Science, vol. 44 Issue: 11, Jun. 2009, pp. 2774-2779.
Nur, Y. et al., "Facile Synthesis of Poly(hydridocarbyne): A Precursor to Diamond and Diamond-like Ceramics," Journal of Macromolecular Science, Part A: Pure and Applied Chemistry, vol. 45 Issue: 5, pp. 358-363.
Narayan, J. et al., "Researchers Find New Phase of Carbon, Make Diamond at Room Temperature," https://news.ncsu.edu/2015/11/narayan-q-carbon-2015/, Nov. 30, 2015, 13 pages.
Zhao, C. et al., "H18 Carbon: A New Metallic Phase with sp2-sp3 Hybridized Bonding Network," Scientific Reports 6, Article: 21879, Feb. 23, 2016, 9 pages.
Narayan, J. et al., "Novel phase of carbon, ferromagnetism, and conversion into diamond," Journal of Applied Physics 118, Dec. 2, 2015, pp. 215303-1-215303-12.

\* cited by examiner

TAILORABLE POLYORBITAL-HYBRID CERAMICS

TECHNICAL FIELD

The present disclosure relates in general to manufacturing ceramics, and more particularly to manufacturing tailorable polyorbital-hybrid ceramics.

BACKGROUND

Replacing metal with ceramics in certain applications may provide significant weight savings. For example, aircraft, spacecraft, and automobiles all use substantial amounts of metal, thereby increasing the overall weight of those vehicles. To replace metal with ceramics, though, ceramics need to be produced with certain properties of metals, such as electrical conductivity, ferromagnetism, and good thermal conductivity, in sufficient quantities and in a manner that facilitates workability of the ceramic so that the ceramic can be formed into various shapes and sizes.

SUMMARY OF EXAMPLE EMBODIMENTS

In an embodiment, a method includes producing a mixed feedstock of at least three halogenated monomer feedstocks. A first of the at least three halogenated monomer feedstocks includes an SP3 carbon, a second of the at least three halogenated monomer feedstocks includes an SP2 carbon, and a third of the at least three halogenated monomer feedstocks includes at least two SP1 carbons. The method further includes producing a polyorbital-hybrid pre-ceramic polymer comprising the SP1 carbons, the SP2 carbon, and the SP3 carbon. The polyorbital-hybrid pre-ceramic polymer is produced by reducing the mixed feedstock such that one or more halogen atoms are removed from the mixed feedstock. The method also includes fabricating the polyorbital-hybrid pre-ceramic polymer into a greenware form and producing a polyorbital-hybrid ceramic carbon comprising the SP1 carbons, the SP2 carbon, and the SP3 carbon. The polyorbital-hybrid ceramic carbon is produced by thermolyzing the polyorbital pre-ceramic polymer.

In another embodiment, a method includes producing a mixed feedstock of at least three halogenated monomer feedstocks. A first of the at least three halogenated monomer feedstocks includes an SP3 silicon, a second of the at least three halogenated monomer feedstocks includes an SP2 silicon, and a third of the at least three halogenated monomer feedstocks includes an SP1 silicon. The method further includes producing a polyorbital-hybrid pre-ceramic polymer comprising the SP1 silicon, the SP2 silicon, and the SP3 silicon. The polyorbital-hybrid pre-ceramic polymer is produced by reducing the mixed feedstock such that a halogen atom is removed from the mixed feedstock. The method includes fabricating the polyorbital-hybrid pre-ceramic polymer into a greenware form and producing a polyorbital-hybrid ceramic silicon comprising the SP1 silicon, the SP2 silicon, and the SP3 silicon. The polyorbital-hybrid ceramic silicon is produced by thermolyzing the polyorbital pre-ceramic polymer.

In another embodiment, a method includes producing a mixed feedstock of at least four halogenated monomer feedstocks. A first of the at least four halogenated monomer feedstocks includes a first SP3 silicon. A second of the at least four halogenated monomer feedstocks includes a second SP3 silicon and one of an SP2 silicon or an SP2 carbon. A third of the at least four halogenated monomer feedstocks includes a third SP3 silicon and one of an SP1 silicon or at least two SP1 carbons. A fourth of the at least four halogenated monomer feedstocks includes an SP3 carbon. The method further includes producing a polyorbital-hybrid pre-ceramic polymer that includes at least one of the first SP3 silicon or the SP3 carbon, at least one of the SP2 silicon or the SP2 carbon, and at least one of the SP1 silicon or the at least two SP1 carbons. The polyorbital-hybrid pre-ceramic polymer may be produced by reducing the mixed feedstock such that a halogen atom may be removed from the mixed feedstock. The method includes fabricating the polyorbital-hybrid pre-ceramic polymer into a greenware form and producing a polyorbital-hybrid ceramic silicon carbide by thermolyzing the polyorbital pre-ceramic polymer. The polyorbital-hybrid ceramic silicon carbide may include at least one of the first SP3 silicon or the SP3 carbon, at least one of the SP2 silicon or the SP2 carbon, and at least one of the SP1 silicon or the at least two SP1 carbons.

The present disclosure may provide numerous advantages. For example, the method of the present disclosure may allow for exploration of the entire hybridization space of carbon-SP1 carbon, SP2 carbon, and SP3 carbon ceramics. As another example, the method may allow for tailoring of the amounts of SP1 carbon, SP2 carbon, and SP3 carbon in the final ceramic. As yet another example, the method may produce pre-ceramic polymers that are workable materials. These workable materials can then be, for example, dissolved, sprayed, molded, shaped, cast as films, or additively deposited and built up to produce a greenware item. Because of the workability of the materials, the disclosure may provide a technical advantage of being able to use a tailorable polyhybrid-orbital ceramic to manufacture products that have previously been unable to be made using Q-carbon, such as, for example, the inductor plates of a transformer or an electric motor.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION OF THE DISCLOSURE

Figure 1:
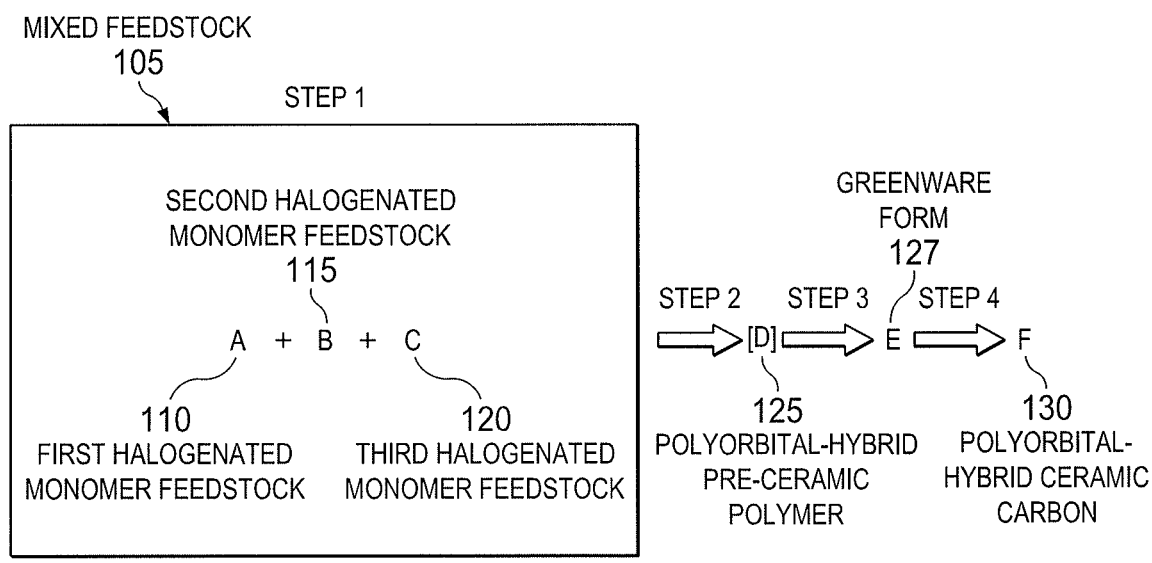
FIG. 1 is a diagram illustrating an example method of manufacturing a tailorable polyorbital-hybrid ceramic carbon, according to an embodiment of the present disclosure.

A new form of carbon, called Q-carbon, was recently discovered. Q-carbon is a carbon ceramic that contains a fixed amount of the SP3 form of carbon (hereinafter, "SP3 carbon") and a fixed amount of the SP2 form of carbon (hereinafter, "SP2 carbon"). Q-carbon may be produced in limited quantities from laser irradiation of carbon films.

There are several drawbacks of using laser irradiation of carbon. First, laser irradiation of carbon does not allow exploration of the full hybridization of carbon ceramics (SP1, SP2, and SP3 carbon). That is, the result will be Q-carbon, which does not include the SP1 form of carbon. Second, laser irradiation of carbon will always produce approximately the same fixed percentage of SP2 carbon and SP3 carbon. Laser irradiation therefore does not provide the ability to tailor the percentages of SP1, SP2, and SP3 carbon in the final ceramic. Because the final ceramic will always have a fixed percentage of SP2 and SP3 carbon, the final ceramic will always have the same properties (e.g., thermal conductivity, electrical conductivity, ferromagnetism, etc.). Third, laser irradiation of carbon produces a thin film or powder that is not workable or produced in sufficient quantities to make large items, such as plates needed for transformers.

Accordingly, aspects of the present disclosure include a method that, in one embodiment, includes producing a mixed feedstock of at least three halogenated monomer feedstocks. A first of the at least three halogenated monomer feedstocks includes an SP3 carbon, a second of the at least three halogenated monomer feedstocks includes an SP2 carbon, and a third of the at least three halogenated monomer feedstocks includes at least two SP3 carbons. The method further includes producing a polyorbital-hybrid pre-ceramic polymer comprising the SP1 carbons, the SP2 carbon, and the SP3 carbon. The polyorbital-hybrid pre-ceramic polymer is produced by reducing the mixed feedstock such that a halogen atom is removed from the mixed feedstock. The method also includes fabricating the polyorbital-hybrid pre-ceramic polymer into a greenware form and producing a polyorbital-hybrid ceramic carbon comprising the SP1 carbons, the SP2 carbon, and the SP3 carbon. The polyorbital-hybrid ceramic carbon is produced by thermolyzing the polyorbital pre-ceramic polymer.

The present disclosure may provide numerous advantages. For example, the method of the present disclosure may allow for exploration of the entire orbital hybridization space of SP1 carbon, SP2 carbon, and SP3 carbon ceramics. As another example, the method may allow for tailoring of the amounts of SP1 carbon, SP2 carbon, and SP3 carbon in the final ceramic. As yet another example, the method may produce pre-ceramic polymers that are workable materials. These workable materials can then be, for example, dissolved, sprayed, molded, shaped, cast as films, or additively deposited and built up to produce a greenware item. Because of the workability of the materials, the disclosure may provide a technical advantage of being able to use a tailorable polyhybrid-orbital ceramic to manufacture products that have previously been unable to be made using Q-carbon, such as the plates of a transformer or electric motor stator and rotor plates.

Other technical advantages will be readily apparent to one skilled in the art from the following figures, descriptions, and claims. Moreover, while specific advantages have been enumerated above, various embodiments may include all, some, or none of the enumerated advantages.

Figure 2:
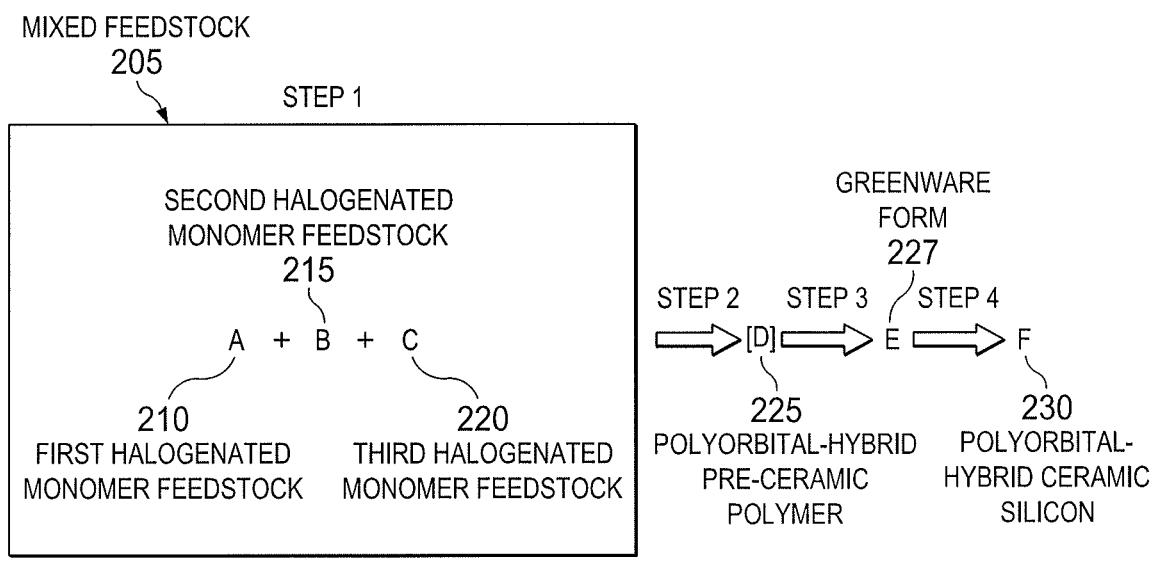
FIG. 2 is a diagram illustrating an example method of manufacturing a tailorable polyorbital-hybrid ceramic silicon, according to an embodiment of the present disclosure.
Figure 3:
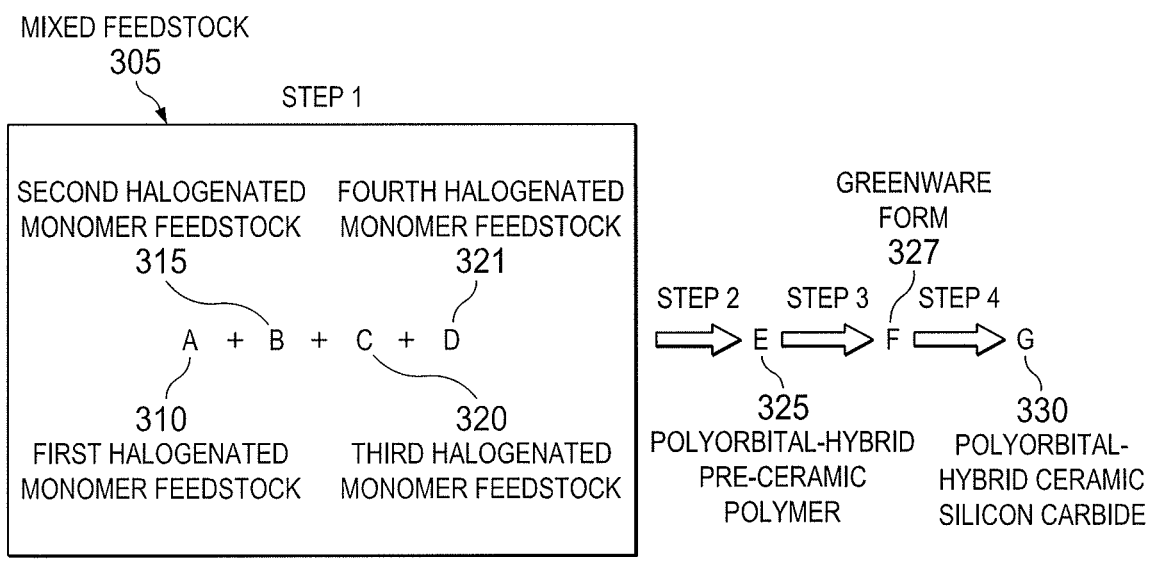
FIG. 3 is a diagram illustrating an example method of manufacturing a tailorable polyorbital-hybrid ceramic silicon carbide, according to an embodiment of the present disclosure.
Figure 4:
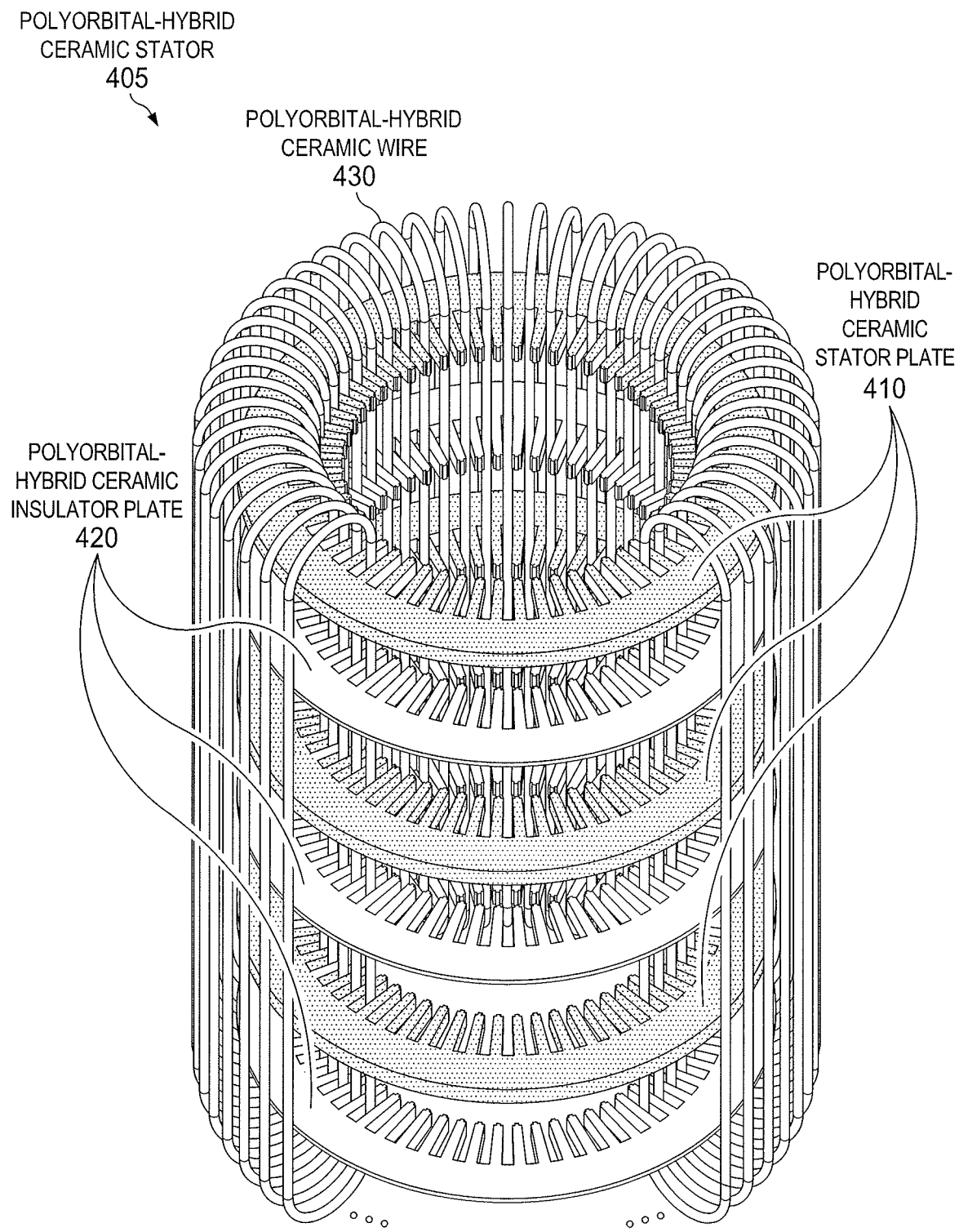
FIG. 4 is an exploded view of an example polyorbital-hybrid ceramic stator formed according to any of the methods of FIGS. 1-3, according to an embodiment of the present disclosure.

Additional details are discussed in FIGS. 1 through 4. FIG. 1 illustrates an example method of manufacturing a tailorable polyorbital-hybrid ceramic carbon 130, FIG. 2 shows an example method of manufacturing a tailorable polyorbital-hybrid ceramic silicon 230, and FIG. 3 shows an example method of manufacturing a tailorable polyorbital-hybrid ceramic silicon carbide 330. FIG. 4 illustrates an example polyorbital-hybrid ceramic stator 405 formed according to any of the methods of FIGS. 1-3.

FIG. 1 is a diagram illustrating an example method of manufacturing a tailorable polyorbital-hybrid ceramic carbon 130, according to an embodiment of the present disclosure. The method of manufacturing a tailorable polyorbital-hybrid ceramic carbon 130 illustrated in FIG. 1 includes four different steps in an embodiment. Each step will be discussed below.

At step one, three halogenated monomer feedstocks are mixed together to produce mixed feedstock 105 in an embodiment. Many methods of mixing feedstocks may be used to produce mixed feedstock 105. In an embodiment, mixed feedstock 105 may be produced by adding the halogenated monomer feedstocks to a reaction chamber.

Mixed feedstock 105 may include first halogenated monomer feedstock 110, second halogenated monomer feedstock 115, and third halogenated monomer feedstock 120 in an embodiment. Mixed feedstock 105 may include respective percentages of first halogenated monomer feedstock 110, second halogenated monomer feedstock 115, and third halogenated monomer feedstock 120 in an embodiment. Mixed feedstock 105 may include a first percentage of SP1 carbon, a second percentage of SP2 carbon, and a third percentage of SP3 carbon. By varying the percentages of each of the feedstocks, polyorbital-hybrid pre-ceramic polymer 125 and polyorbital-hybrid ceramic carbon 130 may have different percentages of SP1 carbon, SP2 carbon, and SP3 carbon. For example, if a polyorbital-hybrid ceramic carbon 130 with an increased amount of SP1 carbon is desired, then mixed feedstock 105 may be comprised of an increased amount of third halogenated monomer feedstock 120, which contributes SP1 carbon to the resulting polyorbital-hybrid ceramic carbon 130. The percentages of SP1 carbon, SP2 carbon, and SP3 carbon in mixed feedstock 105 may be approximately equal to the percentages of SP1 carbon, SP2 carbon, and SP3 carbon in polyorbital-hybrid pre-ceramic polymer 125 and polyorbital-hybrid ceramic carbon 130. These tailorable percentages may provide polyorbital-hybrid pre-ceramic polymer 125 and polyorbital-hybrid ceramic carbon 130 with varying properties, such as increased or decreased ferromagnetism, electrical conductivity, hardness, thermal conductivity, etc.

First halogenated monomer feedstock 110 may be any monomer feedstock that has halogen and can contribute one or more SP3 carbon atoms. For example, first halogenated monomer feedstock 120 may be chloroform. Chloroform has one carbon atom in SP3 configuration. SP3 configuration refers to carbon in the $sp^3$ orbital hybridization configuration. Any amount of first halogenated monomer feedstock 110 may be used in mixed feedstock 105.

Second halogenated monomer feedstock 115 may be any monomer feedstock that has halogen and can contribute one or more SP2 carbon atoms. For example, second halogenated monomer feedstock 115 may be 3,3,3-trichloropropene. 3,3,3-trichloropropene has two carbon atoms in an SP2 configuration. SP2 configuration refers to carbon in the $sp^2$ orbital hybridization configuration. Any amount of second halogenated monomer feedstock 115 may be used in mixed feedstock 105.

Third halogenated monomer feedstock 120 may be any monomer feedstock that has halogen and can contribute two or more SP1 carbon atoms. For example, third halogenated monomer feedstock 120 may be propargyl trichloride. Propargyl trichloride has two carbon atoms in an SP1 configuration. SP1 configuration refers to carbon in the $sp^1$ orbital hybridization configuration. Any amount of third halogenated monomer feedstock 120 may be used in mixed feedstock 105.

In some embodiments, an additional feedstock may be added to mixed feedstock 105 to accomplish doping using p-type doping or n-type doping. For example, mixed feedstock 105 may include a feedstock that includes a Group III p-type donor, such as, for example, boron trichloride. In that example, a Group III p-type donor may facilitate a p-type doping of polyorbital-hybrid ceramic carbon 130. As another example, mixed feedstock 105 may include a Group IV n-type donor, such as, for example, phosphorus trichloride. In that example, a Group IV n-type donor may facilitate an n-type doping of polyorbital-hybrid ceramic carbon 130. One advantage that p-type or n-type doping may provide is that polyorbital-hybrid ceramic carbon 130 may be a p-type material or an n-type material that can be used to fabricate a p-type or an n-type semiconductor.

At step 2, polyorbital-hybrid pre-ceramic polymer 125 may be produced in an embodiment. Polyorbital-hybrid pre-ceramic polymer 125 may be produced by reducing mixed feedstock 105 such that one or more halogen atoms are removed from mixed feedstock 105 in an embodiment. For example, if chloroform is used as first halogenated monomer feedstock 110, reducing mixed feedstock 105 may remove at least one chlorine atom from mixed feedstock 105. In some embodiments, reduction of mixed feedstock 105 may result in removal of all halogen atoms from mixed feedstock 105. In an embodiment, polyorbital-hybrid pre-ceramic polymer 125 having a random $sp^3$ backbone of $sp^3$ carbon may be obtained. Step 2 contemplates many different methods of reduction, including, for example, electrolysis, a solvated electron method, a sodium-potassium eutectic reduction, or a mechano-chemical reduction. Polyorbital-hybrid pre-ceramic polymer 125 may include two or more SP1 carbon atoms contributed by third halogenated monomer feedstock 120, an SP2 carbon contributed by second halogenated monomer feedstock 115, and an SP3 carbon contributed by first halogenated monomer feedstock 110. Polyorbital-hybrid pre-ceramic polymer 125 may be poly(propargyl-co-propyl-co-hydrido-carbyne) in an embodiment. Polyorbital-hybrid pre-ceramic polymer 125 may be produced without using a laser in an embodiment.

At step 3, polyorbital-hybrid pre-ceramic polymer may be fabricated into greenware form 127 in an embodiment. Fabrication into greenware form 127 may be done using any method of fabrication, such as, for example, spraying, molding, shaping, casting, or additively depositing and building up. Greenware form 127 may be fabricated into any form, such as, for example, a transformer plate, a transformer, a stator or rotor plate, an electric motor, a semiconductor, etc.

At step 4, polyorbital-hybrid ceramic carbon 130 may be produced in an embodiment. Polyorbital-hybrid ceramic carbon 130 may be produced by thermolyzing polyorbital-hybrid pre-ceramic polymer 125 in an embodiment. For example, polyorbital-hybrid pre-ceramic polymer 125 may be broken down through heating polyorbital-hybrid pre-ceramic polymer 125. In an embodiment, thermolysis may occur within a temperature range of 100 degrees Celsius to 900 degrees Celsuis. Thermolysis may remove hyrodgen from polyorbital-hybrid pre-ceramic polymer 125. In some embodiments, thermolysis may occur in the absence of an oxidizer, such as, for example, air, oxygen, or a halogen. Thermolysis may also be done using an inert atmosphere, such as, for example, using a noble gas (e.g., argon, helium, neon, krypton, or xenon) or nitrogen.

Polyorbital-hybrid ceramic carbon 130 may include the SP1 carbons donated from third halogenated monomer feedstock 120, the SP2 carbon donated from second halogenated monomer feedstock 115, and the SP3 carbon donated from first halogenated monomer feedstock 110 in an embodiment. Polyorbital-hybrid ceramic carbon 130 may contain approximately the same percentages of SP1 carbon, SP2 carbon, and SP3 carbon as contained in mixed feedstock 105 in an embodiment. Polyorbital-hybrid ceramic carbon 130 may therefore contain all three hybrid orbitals of carbon—SP1, SP2, and SP3. These percentages of SP1 carbon, SP2 carbon, and SP3 carbon may change depending on the amount of each feedstock in an embodiment. As a result, polyorbital-hybrid ceramic carbon 130 may have varying properties, such as increased or decreased ferromagnetism, electrical conductivity, hardness, thermal conductivity, etc. depending on the tailorable percentages of SP1 carbon, SP2 carbon, and SP3 carbon contained in mixed feedstock 105. Polyorbital-hybrid ceramic carbon 130 may be metal-free in an embodiment, which may reduce the weight of the application in which the polyorbital-hybrid ceramic carbon 130 is used.

As an example embodiment of operation, mixed feedstock 105 may be produced by mixing first halogenated monomer feedstock 110, second halogenated monomer feedstock 115, and third halogenated monomer feedstock 120 in a reaction chamber. Mixed feedstock 105 may be reduced to remove one or more halogen atoms to form polyorbital-hybrid pre-ceramic polymer 125. Polyorbital-hybrid pre-ceramic polymer 125 may be fabricated into greenware form 127. Polyorbital-hybrid ceramic carbon 130 may then be produced by thermolysis of polyorbital-hybrid pre-ceramic polymer 125.

FIG. 2 is a diagram illustrating an example method of manufacturing a tailorable polyorbital-hybrid ceramic silicon 230, according to an embodiment of the present disclosure.

The method of manufacturing a tailorable polyorbital-hybrid ceramic silicon 230 illustrated in FIG. 2 includes four different steps in an embodiment. Each step will be discussed below.

At step one, three halogenated monomer feedstocks are mixed together to produce mixed feedstock 205 in an embodiment. Many methods of mixing feedstocks may be used to produce mixed feedstock 205. In an embodiment, mixed feedstock 205 may be produced by adding the halogenated monomer feedstocks to a reaction chamber.

Mixed feedstock 205 may include first halogenated monomer feedstock 210, second halogenated monomer feedstock 215, and third halogenated monomer feedstock 220 in an embodiment. Mixed feedstock 205 may include respective percentages of first halogenated monomer feedstock 210, second halogenated monomer feedstock 215, and third halogenated monomer feedstock 220 in an embodiment. For example, mixed feedstock 205 may include a first percentage of SP1 silicon, a second percentage of SP2 silicon, and a third percentage of SP3 silicon. By varying the percentages of each of the feedstocks, polyorbital-hybrid pre-ceramic polymer 225 and polyorbital-hybrid ceramic silicon 230 may have different percentages of SP1 silicon, SP2 silicon, and SP3 silicon. For example, if a polyorbital-hybrid ceramic silicon 230 with an increased amount of SP1 silicon is desired, then mixed feedstock 205 may be comprised of an increased amount of third halogenated monomer feedstock 220, which contributes SP1 silicon to the resulting polyorbital-hybrid ceramic silicon 230. The percentages of SP1 silicon, SP2 silicon, and SP3 silicon in mixed feedstock 205 may be approximately equal to the percentages of SP1 silicon, SP2 silicon, and SP3 silicon in polyorbital-hybrid pre-ceramic polymer 225 and polyorbital-hybrid ceramic silicon 230. These tailorable percentages may provide polyorbital-hybrid pre-ceramic polymer 225 and polyorbital-hybrid ceramic silicon 230 with varying properties, such as increased or decreased ferromagnetism, electrical conductivity, hardness, thermal conductivity, etc.

First halogenated monomer feedstock 210 may be any monomer feedstock that has halogen and can contribute one or more SP3 silicon atoms. For example, first halogenated monomer feedstock 210 may be trichlorosilane. Trichlorosilane has one silicon atom in an SP3 configuration. SP3 configuration refers to silicon in the $sp^3$ orbital hybridization configuration. Any amount of first halogenated monomer feedstock 210 may be used in mixed feedstock 205.

Second halogenated monomer feedstock 215 may be any monomer feedstock that has halogen and can contribute one or more SP2 silicon atoms. For example, second halogenated monomer feedstock 215 may be trichloro(disilene)silane. Trichloro(disilene)silane has two silicon atoms in an SP2 configuration. SP2 configuration refers to silicon in the $sp^2$ orbital hybridization configuration. Any amount of second halogenated monomer feedstock 215 may be used in mixed feedstock 205.

Third halogenated monomer feedstock 220 may be any monomer feedstock that has halogen and can contribute one or more SP1 silicon atoms. For example, third halogenated monomer feedstock 220 may be trichloro(disilyne)silane. Trichloro(disilyne)silane has two silicon atoms in SP1 configuration. SP1 configuration refers to silicon in the $sp^1$ orbital hybridization configuration. Any amount of third halogenated monomer feedstock 220 may be used in mixed feedstock 205.

In some embodiments, an additional feedstock may be added to mixed feedstock 205 to accomplish doping using p-type doping or n-type doping. For example, mixed feedstock 205 may include a feedstock that includes a Group III p-type donor, such as, for example, boron trichloride. In that example, a Group III p-type donor may facilitate a p-type doping of polyorbital-hybrid ceramic silicon 230. As another example, mixed feedstock 205 may include a Group IV n-type donor, such as, for example, phosphorus trichloride. In that example, a Group IV n-type donor may facilitate an n-type doping of polyorbital-hybrid ceramic silicon 230. One advantage that p-type or n-type doping may provide is that polyorbital-hybrid ceramic silicon 230 may be a p-type material or an n-type material that can be used to fabricate a p-type or an n-type semiconductor.

At step 2, polyorbital-hybrid pre-ceramic polymer 225 may be produced in an embodiment. Polyorbital-hybrid pre-ceramic polymer 225 may be produced by reducing mixed feedstock 205 such that at least one halogen atom is removed from mixed feedstock 205 in an embodiment. For example, if trichloro(disilyne)silane is used as third halogenated monomer feedstock 220, reducing mixed feedstock 205 may remove at least one chlorine atom from mixed feedstock 205. In some embodiments, reduction of mixed feedstock 205 may result in removal of all halogen atoms from mixed feedstock 205. In an embodiment, polyorbital-hybrid pre-ceramic polymer 125 having a random $sp^3$ backbone of $sp^3$ silicon may be obtained. Step 2 contemplates many different methods of reduction, including, for example, electrolysis, a solvated electron method, a sodium-potassium (NaK) eutectic reduction, or a mechano-chemical reduction. Polyorbital-hybrid pre-ceramic polymer 225 may include one or more SP3 silicon atoms contributed by first halogenated monomer feedstock 210, an SP2 silicon contributed by second halogenated monomer feedstock 215, and an SP1 silicon contributed by third halogenated monomer feedstock 220. Polyorbital-hybrid pre-ceramic polymer 225 may be poly(co-silyne-co-silene-co-hydrido-silyne) in an embodiment. Polyorbital-hybrid pre-ceramic polymer 225 may be produced without using a laser in an embodiment. At step 3, polyorbital-hybrid pre-ceramic polymer 225 may be fabricated into greenware form 227 in an embodiment. Fabrication into greenware form 227 may be done using any method of fabrication, such as, for example, spraying, molding, shaping, casting, or additively depositing and building up. Greenware form 227 may be fabricated into any form, such as, for example, a transformer plate, a transformer, a stator or rotor plate, an electric motor, a semiconductor, etc.

At step 4, polyorbital-hybrid ceramic silicon 230 may be produced in an embodiment. Polyorbital-hybrid ceramic silicon 230 may be produced by thermolyzing polyorbital-hybrid pre-ceramic polymer 225 in an embodiment. For example, polyorbital-hybrid pre-ceramic polymer 225 may be broken down through heating polyorbital-hybrid pre-ceramic polymer 225. In an embodiment, thermolysis may occur within a temperature range of 100 degrees Celsius to 900 degrees Celsuis.

Thermolysis may remove hyrodgen from polyorbital-hybrid pre-ceramic polymer 225. In some embodiments, thermolysis may occur in the absence of an oxidizer, such as, for example, air, oxygen, or chlorine. Thermolysis may also be done using an inert atmosphere, such as, for example, using a noble gas (e.g., argon, helium, neon, krypton, or xenon) or nitrogen.

Polyorbital-hybrid ceramic silicon 230 may include the SP3 silicon donated from first halogenated monomer feedstock 210, the SP2 silicon donated from second halogenated monomer feedstock 215, and the SP1 silicon donated from third halogenated monomer feedstock 220 in an embodiment. Polyorbital-hybrid ceramic silicon 230 may contain approximately the same percentages of SP1 silicon, SP2 silicon, and SP3 silicon as contained in mixed feedstock 205 in an embodiment. These percentages of SP1 silicon, SP2 silicon, and SP3 silicon may change depending on the amount of each feedstock in an embodiment. As a result, polyorbital-hybrid ceramic silicon 230 may have varying properties, such as increased or decreased ferromagnetism, electrical conductivity, hardness, etc. depending on the tailorable percentages of SP1 silicon, SP2 silicon, and SP3 silicon contained in mixed feedstock 205. Polyorbital-hybrid ceramic silicon 230 may be metal-free in an embodiment, which may reduce the weight of the application in which the polyorbital-hybrid ceramic silicon 230 is used.

As an example embodiment of operation, mixed feedstock 205 may be produced by mixing first halogenated monomer feedstock 210, second halogenated monomer feedstock 215, and third halogenated monomer feedstock 220 in a reaction chamber. Mixed feedstock 205 may be reduced to remove at least one halogen atom to form polyorbital-hybrid pre-ceramic polymer 225. Polyorbital-hybrid pre-ceramic polymer 225 may be fabricated into greenware form 227. Polyorbital-hybrid ceramic silicon 230 may then be produced by thermolysis of polyorbital-hybrid pre-ceramic polymer 225.

FIG. 3 is a diagram illustrating an example method of manufacturing a tailorable polyorbital-hybrid ceramic silicon. carbide 330. The method of manufacturing a tailorable polyorbital-hybrid ceramic silicon carbide 330 illustrated in FIG. 3 includes four different steps in an embodiment. Each step will be discussed below.

At step one, four halogenated monomer feedstocks are mixed together to produce mixed feedstock 305 in an embodiment. Many methods of mixing feedstocks may be used to produce mixed feedstock 305. In an embodiment, mixed feedstock 305 may be produced by adding the halogenated monomer feedstock to a reaction chamber.

Mixed feedstock 305 may include first halogenated monomer feedstock 310, second halogenated monomer feedstock 315, third halogenated monomer feedstock 320, and fourth halogenated monomer feedstock 321 in an embodiment. Mixed feedstock 305 may include respective percentages of first halogenated monomer feedstock 310, second halogenated monomer feedstock 315, third halogenated monomer feedstock 320, and fourth halogenated monomer feedstock 321 in an embodiment. Mixed feedstock 305 may include a first percentage of SP1 silicon or SP1 carbon, a second percentage of SP2 silicon or SP2 carbon, and a third percentage of SP3 silicon or SP3 carbon. By varying the percentages of each of the feedstocks, polyorbital-hybrid pre-ceramic polymer 325 and polyorbital-hybrid ceramic silicon carbide 330 may have different percentages of SP1 silicon or SP1 carbon, SP2 silicon or SP2 carbon, and SP3 silicon or SP3 carbon. For example, if a polyorbital-hybrid ceramic silicon carbide 330 with an increased amount of SP1 silicon is desired, then mixed feedstock 305 may be comprised of an increased amount of first halogenated monomer feedstock 310, which contributes SP1 silicon to the resulting polyorbital-hybrid ceramic silicon carbide 330. The percentages of SP1 silicon, SP2 silicon, and SP3 silicon in mixed feedstock 305 may be approximately equal to the percentages of SP1 silicon, SP2 silicon, and SP3 silicon in polyorbital-hybrid pre-ceramic polymer 325 and polyorbital-hybrid ceramic silicon carbide 330. These tailorable percentages may provide polyorbital-hybrid pre-ceramic polymer 325 and polyorbital-hybrid ceramic silicon carbide 330 with varying properties, such as increased or decreased ferromagnetism, electrical conductivity, hardness, etc.

First halogenated monomer feedstock 310 may be any monomer feedstock that has halogen, and can contribute one or more SP3 silicon atoms. For example, first halogenated monomer feedstock 310 may include trichlorosilane (contributes one or more SP3 silicon atoms). Trichlorosilane has one silicon atom in an SP3 configuration. Any amount of first halogenated monomer feedstock 310 may be used in mixed feedstock 305.

Second halogenated monomer feedstock 315 may be any monomer feedstock that has halogen and can contribute one or more SP3 silicon atoms and one of one or more SP2 silicon atoms or SP2 carbon atoms. For example, second halogenated monomer feedstock 315 may be vinyltrichlorosilane. Vinyltrichlorosilane has one silicon atom in an SP3 configuration and two carbon atoms in SP2 configuration. Any amount of second halogenated monomer feedstock 315 may be used in mixed feedstock 305.

Third halogenated monomer feedstock 320 may be any monomer feedstock that has halogen and can contribute one or more SP3 silicon atoms and one of one or more SP1 silicon atoms or two or more SP1 carbon atoms. For example, third halogenated monomer feedstock 320 may be propargyltrichlorosilane. Propargyltrichlorosilane has one silicon atom in SP3 configuration and two SP1 carbon atoms. Any amount of third halogenated monomer feedstock 320 may be used in mixed feedstock 305.

Fourth halogenated monomer feedstock 321 may be any monomer feedstock that has halogen, and can contribute one or more SP3 carbon atoms. For example, first halogenated monomer feedstock 310 may include chloroform (contributes one or more SP3 carbon atoms). Chloroform has one carbon atom in an SP3 configuration. Any amount of first halogenated monomer feedstock 310 may be used in mixed feedstock 305.

In some embodiments, an additional feedstock may be added to mixed feedstock 305 to accomplish doping using p-type doping or n-type doping. For example, mixed feedstock 305 may include a feedstock that includes a Group III p-type donor, such as, for example, boron trichloride. In that example, a Group III p-type donor may facilitate a p-type doping of polyorbital-hybrid ceramic silicon 330. As another example, mixed feedstock 305 may include a Group IV n-type donor, such as, for example, phosphorus trichloride. In that example, a Group IV n-type donor may facilitate an n-type doping of polyorbital-hybrid ceramic silicon 330. One advantage that p-type or n-type doping may provide is that polyorbital-hybrid ceramic silicon 330 may be a p-type material or an n-type material that can be used to fabricate a p-type or an n-type semiconductor.

At step 2, polyorbital-hybrid pre-ceramic polymer 325 may be produced in an embodiment. Polyorbital-hybrid pre-ceramic polymer 325 may be produced by reducing mixed feedstock 305 such that at least one halogen atom is removed from mixed feedstock 305 in an embodiment. For example, if propargyltrichlorosilane is used as third halogenated monomer feedstock 320, reducing mixed feedstock 305 may remove at least one chlorine atom from mixed feedstock 305. In some embodiments, reduction of mixed feedstock 305 may result in removal of all halogen atoms from mixed feedstock 305. In an embodiment, polyorbital-hybrid pre-ceramic polymer 125 having a random $sp^3$ backbone of both $sp^3$ carbon and $sp^3$ silicon may be obtained. Step 2 contemplates many different methods of reduction, including, for example, electrolysis, a solvated electron method, a sodium-potassium reduction, or a mechano-chemical reduction. Polyorbital-hybrid pre-ceramic polymer 325 may include at least one of the first SP1 silicon, the second SP1 silicon, or the third SP1 silicon in an embodiment. Polyorbital-hybrid pre-ceramic polymer 325 may further include two or more SP1 carbons, an SP2 carbon, and/or an SP3 carbon. Polyorbital-hybrid pre-ceramic polymer 325 may be poly(co-propargyl-co-vinyl-co-hydrido-carbyne-silyne) in an embodiment. Polyorbital-hybrid pre-ceramic polymer 325 may be produced without using a laser in an embodiment.

At step 3, polyorbital-hybrid pre-ceramic polymer 325 may be fabricated into greenware form 327 in an embodiment. Fabrication into greenware form 327 may be done using any method of fabrication, such as, for example, spraying, molding, shaping, casting, or additively depositing and building up. Greenware form 327 may be fabricated into any form, such as, for example, a transformer plate, a transformer, a stator or rotor plate, an electric motor, a semiconductor, etc.

At step 4, polyorbital-hybrid ceramic silicon carbide 330 may be produced in an embodiment. Polyorbital-hybrid ceramic silicon carbide 330 may be produced by thermolyzing polyorbital-hybrid pre-ceramic polymer 325 in an embodiment. For example, polyorbital-hybrid pre-ceramic polymer 325 may be broken down through heating polyorbital-hybrid pre-ceramic polymer 325. In an embodiment, thermolysis may occur within a temperature range of 100 degrees Celsius to 900 degrees Celsuis. Thermolysis may remove hydrogen from polyorbital-hybrid pre-ceramic polymer 325. In some embodiments, thermolysis may occur in the absence of an oxidizer, such as, for example, air, oxygen, or chlorine. Thermolysis may also be done using an inert atmosphere, such as, for example, using a noble gas (e.g., argon, helium, neon, xenon, or nitrogen).

Polyorbital-hybrid ceramic silicon carbide 330 may include the SP3 silicon donated from first halogenated monomer feedstock 310 or the SP3 carbon donated from fourth halogenated monomer feedstock 321, the SP2 carbon and/or the SP2 silicon donated from second halogenated monomer feedstock 315, the SP1 silicon and/or the SP1 carbons donated from third halogenated monomer feedstock 320 in an embodiment. Polyorbital-hybrid ceramic silicon carbide 330 may contain approximately the same percentages of SP1 silicon carbide, SP2 silicon carbide, and SP3 silicon carbide as contained in mixed feedstock 305 in an embodiment. These percentages of SP1 silicon carbide, SP2 silicon carbide, and SP3 silicon carbide may change depending on the amount of each feedstock in an embodiment. As a result, polyorbital-hybrid ceramic silicon carbide 330 may have varying properties, such as increased or decreased ferromagnetism, electrical conductivity, hardness, etc. depending on the tailorable percentages of SP1 silicon carbide, SP2 silicon carbide, and SP3 silicon carbide contained in mixed feedstock 305. Polyorbital-hybrid ceramic silicon carbide 330 may be metal-free in an embodiment, which may reduce the weight of the application in which the polyorbital-hybrid ceramic silicon carbide 330 is used.

As an example embodiment of operation, mixed feedstock 305 may be produced by mixing first halogenated monomer feedstock 310, second halogenated monomer feedstock 315, third halogenated monomer feedstock 320, and fourth halogenated monomer feedstock 321 in a reaction chamber. Mixed feedstock 305 may be reduced to remove at least one halogen atom to form polyorbital-hybrid pre-ceramic polymer 325. Polyorbital-hybrid pre-ceramic polymer 325 may be fabricated into greenware form 327. Polyorbital-hybrid ceramic silicon carbide 330 may then be produced by thermolysis of polyorbital-hybrid pre-ceramic polymer 325.

FIG. 4 is an exploded view of an example polyorbital-hybrid ceramic stator 405 formed according to any of the methods of FIGS. 1-3, according to an embodiment of the present disclosure. As noted above, the methods of FIGS. 1-3 may include fabrication of a poly-orbital pre-ceramic polymer into a greenware form, which is then thermolyzed to produce a polyorbital-hybrid ceramic. In an embodiment, the polyorbital-hybrid ceramic may be polyorbital-hybrid ceramic stator 405. Such a polyorbital-hybrid ceramic stator 405 may be used in, for example, an electric motor. Although illustrated as a stator, the methods of FIGS. 1-3 may be used to produce other products, such as a rotor. Polyorbital-hybrid ceramic stator 405 may be metal-free and thus lightweight in an embodiment. Polyorbital-hybrid ceramic stator 405 may be formed by, for example, additive manufacturing (e.g., building or printing layer by layer). Polyorbital-hybrid ceramic stator 405 may have different tailored polyorbital-hybrid ceramics, thereby producing components that have varying properties (e.g., ferromagnetism, conductivity, insulation, etc.). In the example embodiment of FIG. 4, polyorbital-hybrid ceramic stator 405 includes polyorbital-hybrid ceramic stator plate 410, polyorbital-hybrid ceramic insulator plate 420, and polyorbital-hybrid ceramic wire 430.

Polyorbital-hybrid ceramic stator plate 410 may be a stator plate produced according to any of the methods of FIGS. 1-3. For example, polyorbital-hybrid ceramic stator plate 410 may be produced according to the method of FIG. 1. In that example, polyorbital-hybrid ceramic stator plate 410 may be a ferromagnetic carbon ceramic. As explained throughout this disclosure, the percentages of SP1, SP2, and SP3 carbon may be tailored according to the desired properties of the product. In this example, polyorbital-hybrid ceramic stator plate 410 may have 2% SP1 carbon, 15% SP2 carbon, and 83% SP3 carbon. Other percentages may be used.

Polyorbital-hybrid ceramic insulator plate 420 may be an insulator plate produced according to any of the methods of FIGS. 1-3. For example, polyorbital-hybrid ceramic insulator plate 420 may be produced according to the method of FIG. 1. In that example, polyorbital-hybrid ceramic insulator plate 420 may be an electrically insulative, thermally conductive carbon ceramic. As explained throughout this disclosure, the percentages of SP1, SP2, and SP3 carbon may be tailored according to the desired properties of the product. In this example, polyorbital-hybrid ceramic insulator plate 420 may have 2% SP1 carbon, 2% SP2 carbon, and 96% SP3 carbon. Other percentages may be used.

Polyorbital-hybrid ceramic wire 430 may be a wire produced according to any of the methods of FIGS. 1-3. For example, polyorbital-hybrid ceramic wire 430 may be produced according to the method of FIG. 1. In that example, polyorbital-hybrid ceramic wire 430 may be an electrically conductive carbon ceramic. As explained throughout this disclosure, the percentages of SP1, SP2, and SP3 carbon may be tailored according to the desired properties of the product. In this example, polyorbital-hybrid ceramic wire 430 may have 75% SP1 carbon, 15% SP2 carbon, and 10% SP3 carbon to achieve electrical conductivity. Other percentages may be used. Polyorbital-hybrid ceramic wire 430 may be insulated by a polyorbital-hybrid ceramic insulator, such as the same material used to form polyorbital-hybrid ceramic insulator plate 420 in an embodiment.

Other technical advantages will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method, comprising:
producing a mixed feedstock of at least three halogenated monomer feedstocks, wherein a first of the at least three halogenated monomer feedstocks includes an SP3 carbon, a second of the at least three halogenated monomer feedstocks includes an SP2 carbon, and a third of the at least three halogenated monomer feedstocks includes at least two SP1 carbons;
producing a polyorbital-hybrid pre-ceramic polymer comprising the SP1 carbons, the SP2 carbon, and the SP3 carbon, wherein the polyorbital-hybrid pre-ceramic polymer is produced by reducing the mixed feedstock such that one or more halogen atoms are removed from the mixed feedstock;
fabricating the polyorbital-hybrid pre-ceramic polymer into a greenware form; and
producing a polyorbital-hybrid ceramic carbon comprising the SP1 carbons, the SP2 carbon, and the SP3 carbon, wherein the polyorbital-hybrid ceramic carbon is produced by thermolyzing the polyorbital pre-ceramic polymer.

2. The method of claim 1, wherein the first of the at least three halogenated monomer feedstocks comprises chloroform.

3. The method of claim 1, wherein the second of the at least three halogenated monomer feedstocks comprises 3,3,3-trichloropropene.

4. The method of claim 1, wherein the third of the at least three halogenated monomer feedstocks comprises propargyl trichloride.

5. The method of claim 1, wherein:
the mixed feedstock comprises respective first percentages of the SP1 carbons, the SP2 carbon, and the SP3 carbon;
the polyorbital-hybrid pre-ceramic polymer comprises respective second percentages of the SP1 carbons, the SP2 carbon, and the SP3 carbon; and
the respective first percentages are approximately equal to the respective second percentages.

6. The method of claim 1, wherein the polyorbital-hybrid preceramic polymer is thermolyzed within a temperature range of 100 degrees Celsius to 900 degrees Celsius.

7. The method of claim 1, wherein the mixed feedstock further comprises one of a Group III p-type donor or a Group IV n-type donor such that the polyhybrid orbital ceramic carbon comprises a p-type doping or an n-type doping.

8. The method of claim 7, wherein the Group III p-type donor comprises boron trichloride.

9. The method of claim 7, wherein the Group IV n-type donor comprises phosphorus trichloride.

10. The method of claim 1, wherein the polyorbital-hybrid pre-ceramic polymer is produced without using a laser.

* * * * *